US010901296B1

(12) United States Patent
Eltes et al.

(10) Patent No.: US 10,901,296 B1
(45) Date of Patent: Jan. 26, 2021

(54) ELECTRO-OPTICAL DEVICE WITH ACTIVE ELECTRO-OPTICAL WAVEGUIDE STRUCTURE

(71) Applicant: INTERNATIONAL BUSINESS MACHINES CORPORATION, Armonk, NY (US)

(72) Inventors: Karl Felix Sebastian Eltes, Zurich (CH); Darius Urbonas, Adliswil (CH)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/578,896

(22) Filed: Sep. 23, 2019

(51) Int. Cl.
*G02F 1/365* (2006.01)
*G02F 1/35* (2006.01)

(52) U.S. Cl.
CPC ............ *G02F 1/365* (2013.01); *G02F 1/3501* (2013.01)

(58) Field of Classification Search
CPC ................................ G02F 1/365; G02F 1/3501
USPC ............................................................ 385/2
See application file for complete search history.

(56) References Cited

U.S. PATENT DOCUMENTS

| 8,798,406 | B1 | 8/2014 | Hochberg |
| 9,417,469 | B2 | 8/2016 | Abel |
| 9,568,752 | B2 | 2/2017 | Ho |
| 9,703,127 | B2 | 7/2017 | Abel |
| 2010/0176881 | A1* | 7/2010 | Berkhout ............... H03F 1/3205 330/251 |
| 2015/0212346 | A1* | 7/2015 | Zheng ..................... G02F 1/025 398/186 |
| 2016/0357037 | A1 | 12/2016 | Blasl |

FOREIGN PATENT DOCUMENTS

WO        2016115513 A1     7/2016

OTHER PUBLICATIONS

Alexander, et al., "Nanophotonic Pockets Modulators on a Silicon Nitride Platform," Nature Communications, (2018) 9:3444, DOI: 10.1038/s41467-018-05846-6, pp. 1-6.
(Continued)

*Primary Examiner* — Jerry M Blevins
(74) *Attorney, Agent, or Firm* — Robert C. Bunker (57) ABSTRACT

Embodiments of the present invention are directed to an electro-optical device that comprises a substrate, a waveguide structure, and two contact layer portions. The contact layer portions extend side-by-side along a direction of light propagation that is parallel to the substrate. The waveguide structure may guide light along said direction of light propagation. The waveguide structure comprises an optically nonlinear material and interdigitated crosspieces. The crosspieces extend parallel to the substrate from each of said two contact layer portions and transversely to such portions. The optically nonlinear material is in contact with at least portions of the interdigitated crosspieces. Said crosspieces are not in direct contact with each other, forming a composite waveguide core involving an alternating sequence of distinct materials along said propagation direction. The distinct materials comprise said semiconductor material and at least one additional material, whereby the composite waveguide core has an effective refractive index.

18 Claims, 8 Drawing Sheets

(56) References Cited

OTHER PUBLICATIONS

Cheben, et al. "Subwavelength integrated photonics," Nature, vol. 560, Aug. 30, 2018, pp. 565-572, https://www.nature.com/articles/s41586-018-0421-7.

Eltes, et al., "A novel 25 Gbps electro-optic Pockels modulator integrated on an advanced Si photonic platform," 978-1-5386-3559-9/17, IEEE, 2017, pp. IEDM17-601-604.

Heni, et al., "Silicon-Organic and Plasmonic-Organic Hybrid Photonics," ACS Photonics, 2017, 4, pp. 1576-1590.

Steglich, et al., "Quadratic electro-optic effect in silicon-organic hybrid slot-waveguides," Optics Letters, vol. 43, No. 15, Aug. 1, 2018, pp. 3598-3601.

Wang, et al., "Integrated lithium niobate electro-optic modulators operating at CMOS-compatible voltages," Nature, (2018), https://www.nature.com/articles/s41586-018-0551-y, pp. 1-12.

* cited by examiner

FIG. 10

ELECTRO-OPTICAL DEVICE WITH ACTIVE ELECTRO-OPTICAL WAVEGUIDE STRUCTURE

BACKGROUND

The present invention relates in general to the fields of electro-optical devices and photonic switches and, in particular, to devices with effective-index waveguides, i.e., waveguiding structures involving a composite waveguide core with an alternating sequence of distinct materials.

Integrated electro-optical (EO) modulators for high-order modulation formats may benefit from the integration of optically nonlinear materials such as Pockels materials with semiconductor materials such as silicon. Waveguide structures can be designed to enhance the EO overlap, which may potentially result in improving the modulation efficiency and reduce the footprint and/or energy consumption.

Current solutions typically rely on slot waveguides or lateral electrodes. Slot waveguides often come with high propagation losses and require thin silicon slabs of high resistance for electrical contacts. Lateral electrodes result in low field strength across the optically nonlinear material.

SUMMARY

According to at least one aspect, the present invention is embodied as an electro-optical device. The device comprises a substrate, as well as a waveguide structure and two contact layer portions, each supported by the substrate. The contact layer portions extend side-by-side along a direction of light propagation that is parallel to the substrate. The waveguide structure is generally designed for guiding light along said direction of light propagation. In detail, the waveguide structure comprises an optically nonlinear material, as well as interdigitated crosspieces of a semiconductor material. The crosspieces extend parallel to the substrate, from each of the two contact layer portions, and transversely to such portions. The optically nonlinear material is in contact with at least portions of the interdigitated crosspieces. Said crosspieces, however, are not in direct contact with each other, so as to form a composite waveguide core with an alternating sequence of distinct materials along said propagation direction. The distinct materials comprise said semiconductor material and at least one additional material, whereby the composite waveguide core has an effective refractive index.

In embodiments, the optically nonlinear material is structured so as to have portions between the crosspieces, whereby said at least one additional material of the alternating sequence comprises said optically nonlinear material. Preferably, said portions of the optically nonlinear material entirely fill spaces between the crosspieces, whereby said distinct materials of the alternating sequence consist of said semiconductor material and said nonlinear material. The optically nonlinear material may for instance clad the crosspieces, such that said portions of the nonlinear material are intercalated between the crosspieces. In variants, the nonlinear material may for example coat the crosspieces, while portions of a dielectric material are arranged between the coated crosspieces. This dielectric material may advantageously be a high-κ dielectric material. In other variants, the nonlinear material is formed as a layer extending on top of the substrate, and the interdigitated crosspieces extend on top of the layer of optically nonlinear material, so as to be in contact therewith.

According to another but related aspect, the invention is embodied as a photonic switch comprising an electro-optical device such as described above.

Devices embodying the present invention will now be described, by way of non-limiting examples, and in reference to the accompanying drawings.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. Similar or functionally similar elements in the figures have been allocated the same numeral references, unless otherwise indicated. In the drawings:

FIGS. 3-9 show 2D cross-sectional views of a device such as shown in FIG. 2 or variants thereto, subject to FIG. 3C, which is a top view of the device of FIG. 2. FIGS. 3A, 4A, and 5A are partial, transverse cross-sections. The plane upon which the views of FIGS. 3A, 4A, and 5A are taken corresponds to a plane oriented as P1 in FIG. 2, whereas the longitudinal cross-sections of FIGS. 3B, 4B, 5B, 6, and 7 are taken in a plane corresponding to P2 in FIG. 2. FIGS. 8 and 9 are full transverse cross-sections in a plane corresponding to P3 in FIG. 2.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Willing to achieve an integrated Pockels modulator having both low propagation losses and high EO overlap, the present invention is directed to novel types of electro-optical devices, which make use of a subwavelength waveguide (i.e., involving a composite waveguide core having an effective refractive index) and interdigitated intra-waveguide electrodes. This is explained in detail in the following description.

In reference to FIGS. 2-9, an aspect of the invention is described, which concerns an electro-optical device 10-15.

This electro-optical (EO) device basically comprises two contact layer portions 120 and a waveguide structure, which both are supported on a substrate 110. The two contact layer portions 120 (hereafter "contact layers") extend side-byside, parallel to the substrate 110, and along a direction D of light propagation. The waveguide structure is generally designed for guiding light along this direction D of light propagation, which is assumed to be parallel to axis y in the accompanying figures.

Figure 1:
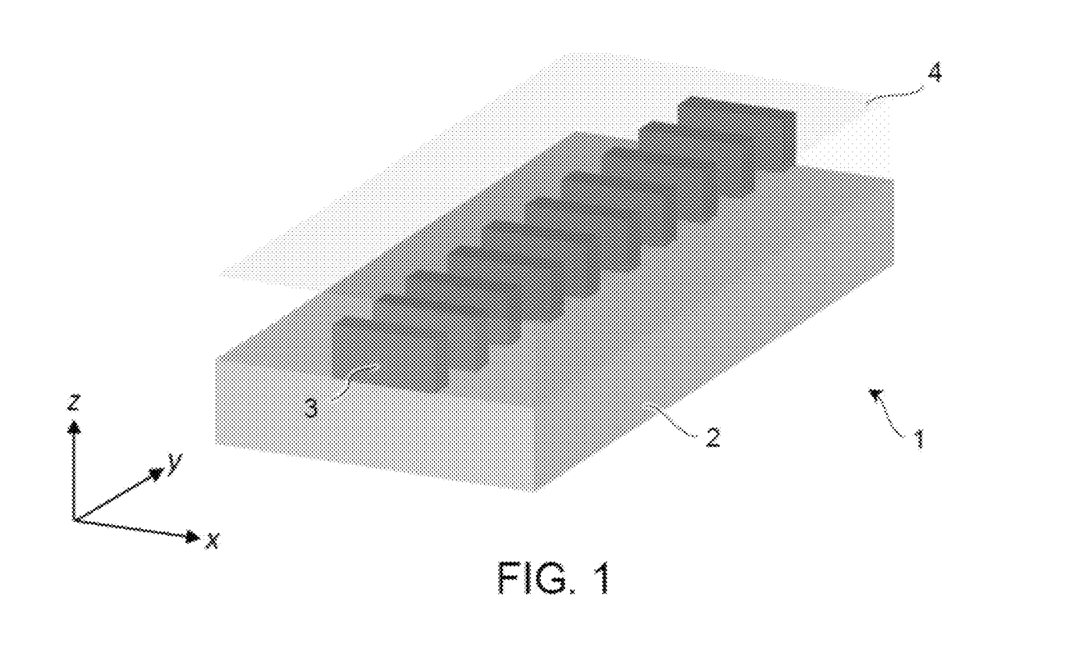
FIG. 1 is a 3D view of an exemplary, effective-index waveguide structure.
Figure 2:
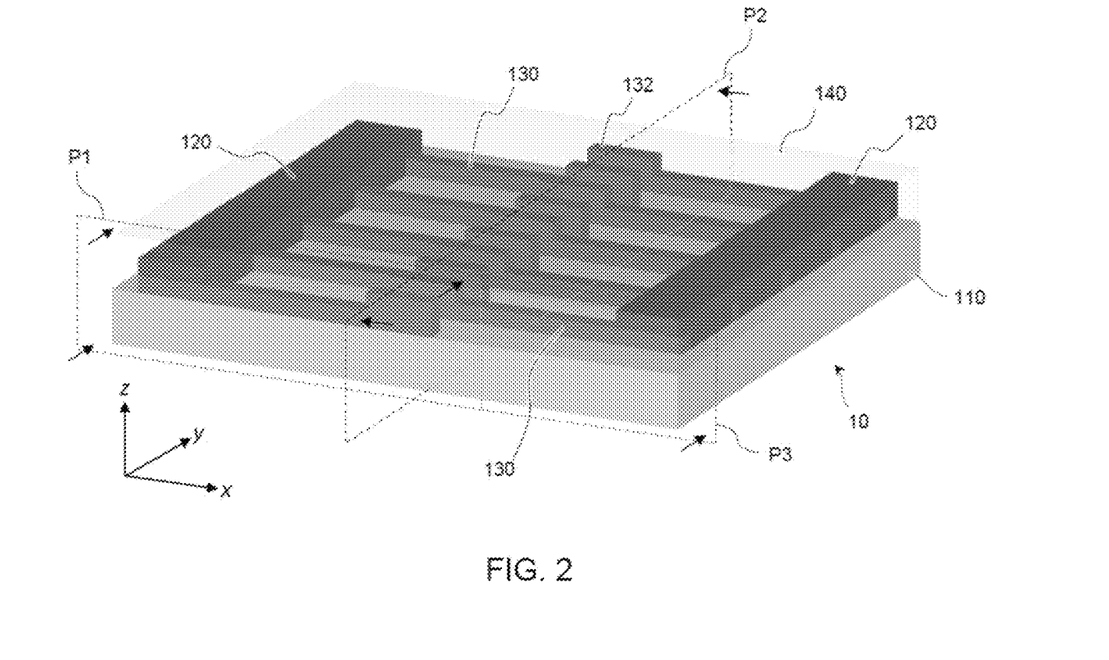
FIG. 2 is a 3D view of an electro-optical device according to embodiments.

As seen in FIG. 2, the waveguide structure comprises interdigitated crosspieces 130, 132, made of a semiconductor material, e.g., silicon. The crosspieces extend from each of the two contact layers 120, in an alternated fashion, and parallel to the substrate 110, i.e., parallel to (x, y). That is, the crosspieces are arranged between the contact layers 120, in order to form an in-plane, interdigitated arrangement, such that inner ends of the crosspieces face each other, along the propagation direction. The crosspieces extend transversely to such portions 120, e.g., perpendicularly from lateral, inner sides of the contact layers 120.

The waveguide structure further involves an optically nonlinear material 140-146, which is in contact with at least portions 132 of the interdigitated crosspieces 130, 132. Properties of this material 140-146 are described later in detail.

The crosspieces 130, 132 are not in direct contact with each other, so as to form a composite waveguide core 112, 114, 132, 142, 146. The core involves an alternating sequence of distinct materials along the propagation direction D. That is, the sequence comprises at least one additional material 112, 114, 142, 146, in addition to the semiconductor material 132. This results in a composite waveguide core that has an effective refractive index for a radiation of interest, i.e., meant to be guided through the waveguide core, in operation.

The substrate 110 can for instance comprise or consists of a lower cladding 110, as assumed in the accompanying drawings. The substrate will likely involve additional layers (not shown), which may notably ensure mechanical stability for the device. Such layers may for instance involve one or more electrically conducting layers, allowing the contact layers to be powered, e.g., through vias (not shown). Note, FIGS. 3B, 3C, 4B, 5B, 6 and 7 show an example of electrical circuit 170 used to power the electrodes 130. The circuit 170 may typically include portions embodied as electrically conducting layers, patterned layers, layer portions, electrical traces, vias, etc., as usual with such devices 10-15. In addition, the circuit may be more sophisticated in practice, e.g., including controllers (not shown), as well as other components (not shown). The contact layers 120 are not necessarily in direct contact with such electrically conducting layers; they will instead likely be cladded, at least partly, by one or more cladding layers 112, 140, as assumed in the accompanying drawings. Also, the waveguide structure is cladded, e.g., on top and bottom, by one or more cladding layers 112, 140, as necessary to form a waveguiding structure.

The semiconducting material used for the crosspieces 130, 132 may for example comprise Si, Ge, SiGe, GaAs, InGaAs, InP, GaP, InGaP, InAs, InAlGaAs, GaSb, GaN, AlN, GaAsP, and AlGaP. Silicon is preferably used, though. The semiconductor crosspieces 130, 132 are used to apply a modulating electric field across the optically nonlinear material 140-146 (in an interdigitated fashion), in operation, hence the multiple electrical contacts. That is, the nonlinear material will be subject to a change of refractive index upon applying an electric field. For that reason, the nonlinear material will be at least in contact with surface portions 132 of the crosspieces.

The nonlinear material may for example be structured as a mere layer 144 supporting the crosspieces, in direct contact therewith (as in FIGS. 5A, 5B), while a dielectric material 112 fills spaces between the portions 132 of the semiconductor crosspieces 130, 132. In variants, the nonlinear material comprises or consists of material portions 140, 142, 146 that are intercalated between the portions 132 of the crosspieces, as in FIGS. 3, 4, 6, and 7. Thus, at least one additional material (e.g., be it the nonlinear material 140, 142, 146 or a mere dielectric material 112, 114) is involved between the crosspieces 130, 132 (or at least between the central portions 132 of such crosspieces) in the composite waveguide. This additional material may thus include portions of the nonlinear material 140, 142, 146 and/or a distinct dielectric material 112, 114, which may for instance be a high-κ material 114, as in embodiments discussed later.

The nonlinear material 140-146 is nonlinear, optically, i.e., it has a given second-order susceptibility and/or a given third-order susceptibility, which are substantial enough to confer a measurable, nonlinear optical property to the material 140, which property is here exploited to modulate the electromagnetic field. Such susceptibilities refer to nonlinear optical susceptibilities, and more precisely to the second-order component χ(2) and the third-order component χ(3) of the electric susceptibility of this material. In detail, the nonlinear property o the material 140-146 is such that the polarization P is not linearly proportional to the electric field E. The polarization P can be written as series in E, whose coefficients are the nonlinear susceptibilities. The first coefficients of the series respectively correspond to χ(1), the linear susceptibility, χ(2), the second-order susceptibility (used to describe phenomena such as the Pockels effect), χ(3), the third-order susceptibility (used to describe phenomena such as the Kerr effect), etc.

The nonlinear material 140-146 is a material that is assumed, here, to exhibit a substantial Pockels effect and/or a non-negligible Kerr effect, i.e., one or each of the second term, χ(2), and the third term, χ(3), is significant. For example, this material may comprise a single crystal of gallium phosphide (GaP). Gallium phosphide provides large second- and third-order susceptibility and allow an excellent power budget at telecom wavelengths, due to its large bandgap (no two-photon absorption). Other examples of suitable materials include lithium niobate (LiNbO3), aluminum nitride (AlN), barium titanate (BTO), lead zirconate titanate (PZT), and gallium nitride (GaN)). More generally, various other materials can be contemplated, such as:

Where a substantial χ(2) is desired: BaTiO3, BaxSr1-xTiO3, Pb[ZrxTi1-x]03, [PbyLa1-y][ZrxTi1-x]O3, KNbO3, BiFeO3, KTaO3, LiNbO3, HfO2, Hf1-xZrxO2, GaP, Ba2NaNb5O15, KH2PO4, NH4H2PO4, BaB2O4, LiB3O5, and organic chromophores, or Where a substantial χ(3) is desired: SiN, organic chromophores, polymers, graphene, CdSe-based quantum dots, LiNbO3, and BaB2O4.

Such materials have Pockels coefficients that are typically between 10 and 10 000 pm/V, or EO Kerr coefficient between 10-19 and 10-12 m2/W. Some of these material, e.g., Gallium phosphide and lithium niobite, exhibit both a large Pockels coefficient and a substantial Kerr coefficient.

Owing to the alternating sequence of distinct materials it involves, the composite waveguide has an effective refractive index neff (typically about 2.4 for Si-based crosspieces with SiO2 intercalated in-between). Their central portions 132, which overlap due to the interdigitated arrangement of the crosspieces 130, 132, can be regarded as forming a subwavelength grating, in view of wavelengths of radiation to be used in operation. That is, gratings fabricated in the propagation plane of the optical mode can be "invisible" to the light if the period Λ is small enough (Λ<<λvac2neff). For such structures, the optical mode experiences an effective refractive index, which is the average index of the waveguide in the propagation direction D. Note, such structures can be achieved so as not to cause any additional propagation losses compared to "standard waveguides"; they can even reduce optical losses, as illustrated later with an example.

To summarize so far, the desired EO effect can be mainly based on the χ(2) coefficient (Pockels) or the χ(3) coefficient (Kerr) of the nonlinear material. Such coefficients cause a change of refractive index in the nonlinear material upon applying an electric field. Now, because this change is very fast, high-speed modulation of the electromagnetic field can be achieved in practice. Note, the modulation efficiency also depends on the electric-field strength. For example, for a fixed voltage, the efficiency scales with the inverse of the gap between adjacent electrode portions.

The beam portions 130 of the semiconducting crosspieces (i.e., the portions extending from the lateral contact layers 120) can thus be regarded as electrodes, which are used to apply the modulating electric field across the nonlinear material in an interdigitated fashion. That is, periodically repeated elements 130 of the waveguide are used as electrodes. As it can be realized, this solution makes it possible to design an integrated, nonlinear modulator (e.g., a Pockels modulator) with both low propagation losses and a large electro-optical overlap.

Integrated electro-optical modulators for high-order modulation formats will advantageously make use of nonlinear materials such as described above with a semiconductor structure, e.g., made of silicon. The change obtained in the refractive index of the nonlinear material upon applying an electric field is very fast, a thing that can advantageously be exploited for high-speed modulation, as in applications listed below. A waveguide structure such as discussed above enhances the EO overlap, can improve the modulation efficiency, and furthermore reduce the footprint and/or the power consumption of the device 10-15.

In comparison, known solutions for modulators in silicon photonics based on Pockels materials rely on devices that have either high propagation losses or low EO overlap. For example, slot waveguides too permit to strongly confine the optical mode but they are nonetheless extremely sensitive to roughness, which leads to high propagation losses. On the contrary, here the effective-index waveguide structure makes it possible to reduce the optical losses. As another example, EO modulators with lateral electrodes have been proposed. However, contrary to the present approach, no EO overlap enhancement is possible (such structures do not rely on a subwavelength grating). Thus, the present approach makes it possible to have both low optical losses and a high EO overlap. This is made possible thanks to the subwavelength waveguide structure involving a nonlinear material and the interdigitated, intra-waveguide electrodes used to module the field.

The skilled person will appreciate that embodiments of the invention may advantageously be used in a variety of applications, notably in:

High-speed IO chip interfaces, e.g., for cloud computing and data centers;

Power-efficient optical interconnects for connecting processors and memory, e.g., for cognitive computing workloads;

Efficient switches for photonic sensors, e.g., for IoT applications;

Electrically pumped lasers, e.g., for laser-on-chip applications; and

Low-temperature photonic switches, for instance for quantum applications, e.g., for photonic quantum computers or in input/output interfaces as used in quantum computers based on superconducting qubit technology.

All this is now described in detail, in reference to particular embodiments of the invention. To start with, the EO device 10-12, 14, 15 involves an optically nonlinear material 140, 142, 146 patterned so as to have portions of material between the crosspieces 130, 132, as illustrated in FIGS. 2-4, 6, and 7. In that case, the composite waveguide core includes said optically nonlinear material 140, 142, 146, in addition to the semiconductor material 132, as part of the alternating sequence of distinct materials.

Figure 3A:
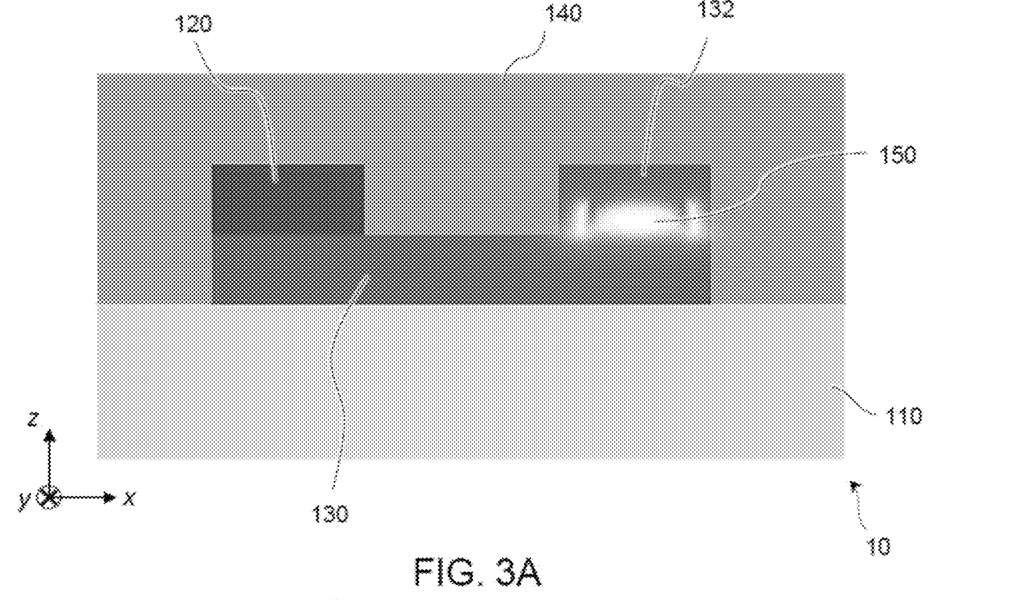
Figure 3B:
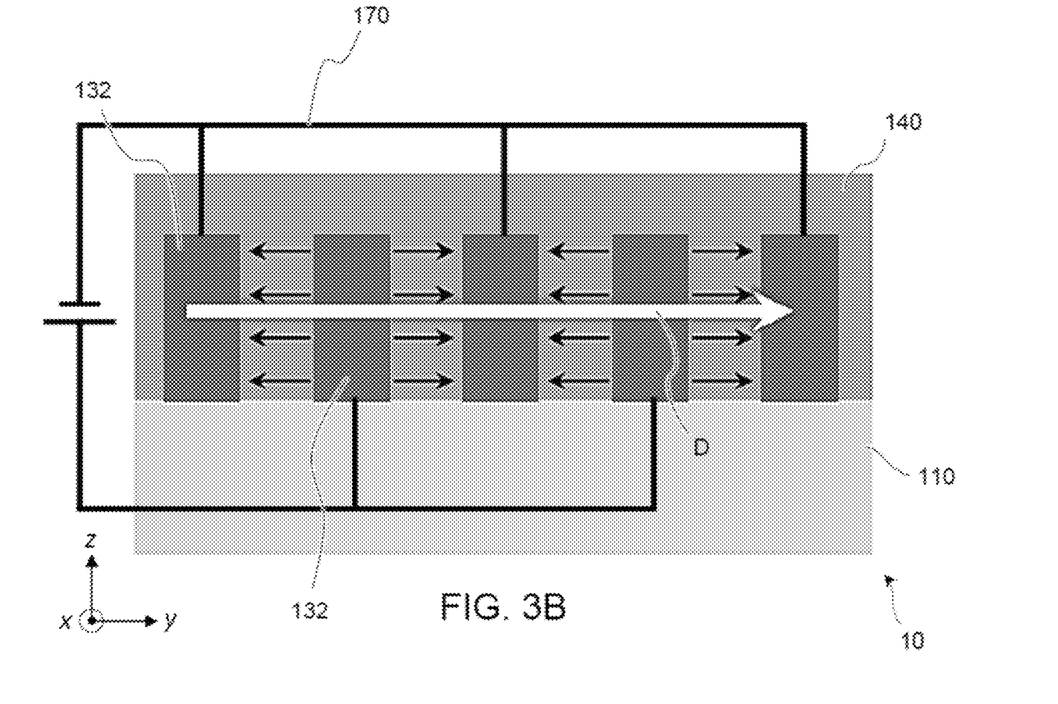
Figure 3C:
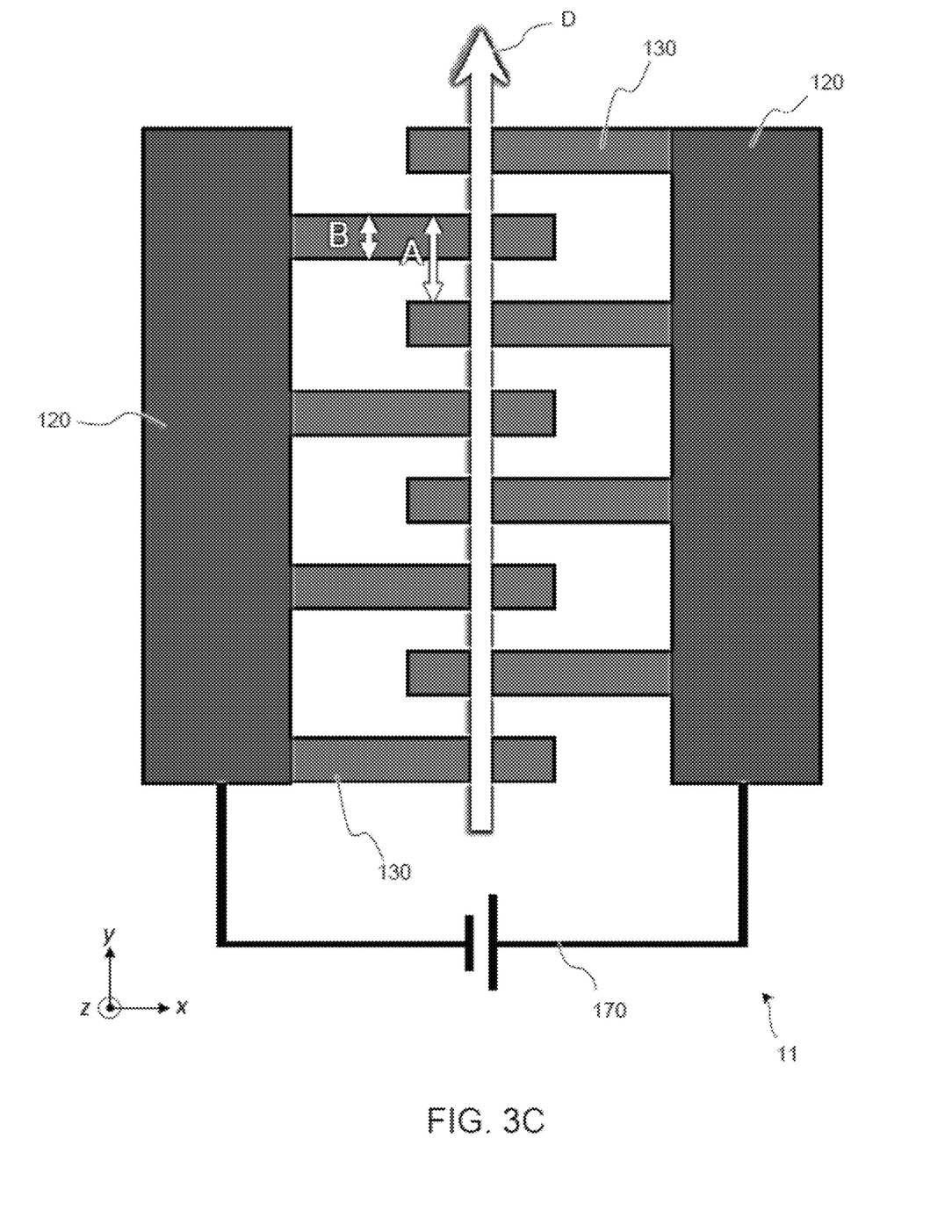
Figure 4A:
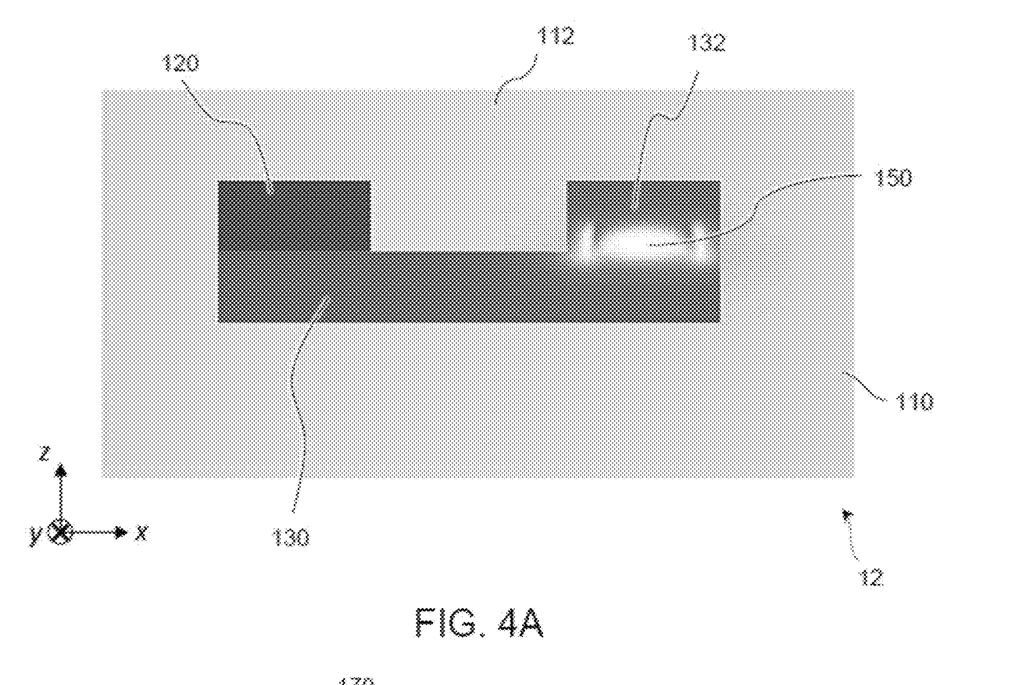
Figure 4B:
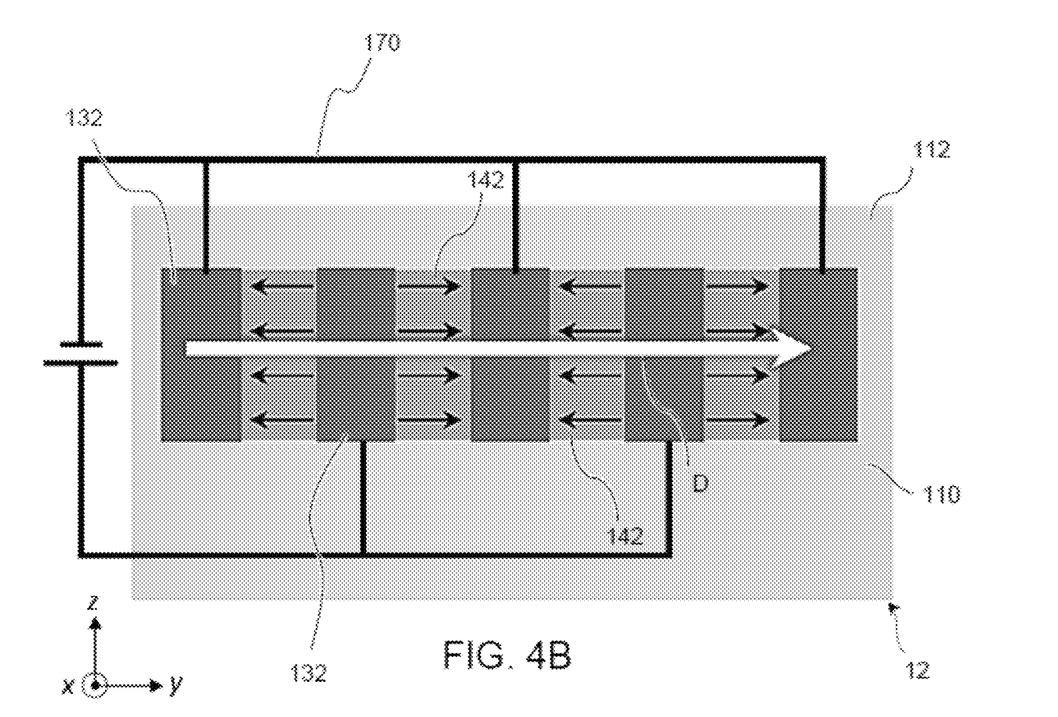

In embodiments such as depicted in FIGS. 2-4, the EO device 10-12 comprises a nonlinear material 140, 142 that is patterned (i.e., structured) so as to exhibit portions 140, 142 of material that entirely fill spaces left between the crosspieces 130, 132. In that case, the alternating sequence of distinct materials consists of the semiconductor material 130, 132 and the nonlinear material 140, 142. A dielectric layer 112 may possibly come to clad the composite waveguide core on top, as shown in FIG. 4.

In the example of FIGS. 2 and 3, the EO device 10, 11 comprises a nonlinear material 140 that clads the crosspieces 130, 132, such that portions of the nonlinear material 140 are intercalated between the crosspieces 130, 132. As seen in FIG. 3A, the nonlinear material 140 clads the crosspieces 130, 132 on the opposite side of the substrate 110 with respect to the crosspieces 130, 132 but nonetheless infiltrates the subwavelength grating.

In the example of FIGS. 4A and 4B, the nonlinear material 142 of the EO device 12 is assumed to have been processed so as to only consist of portions 142 intercalated between the central portions 132 of the crosspieces. I.e., the nonlinear material only forms part of the subwavelength grating. A cladding layer 112 of a distinct material nevertheless coats both the crosspieces 130, 132 and the intercalated portions 142 of nonlinear material. Note, the same cladding material 110, 112 may possibly be used both as a lower cladding material 110 and as an upper cladding layer 112, to coat the crosspieces 130, 132 and the intercalated portions 142 of the nonlinear material, on each side thereof (on top and bottom).

Figure 6:
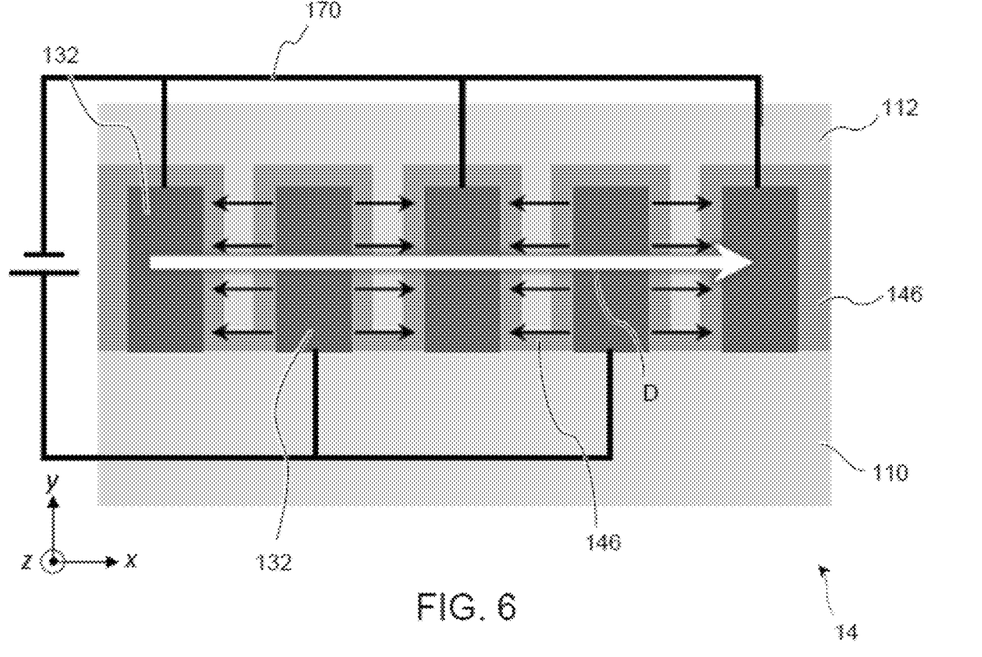
Figure 7:
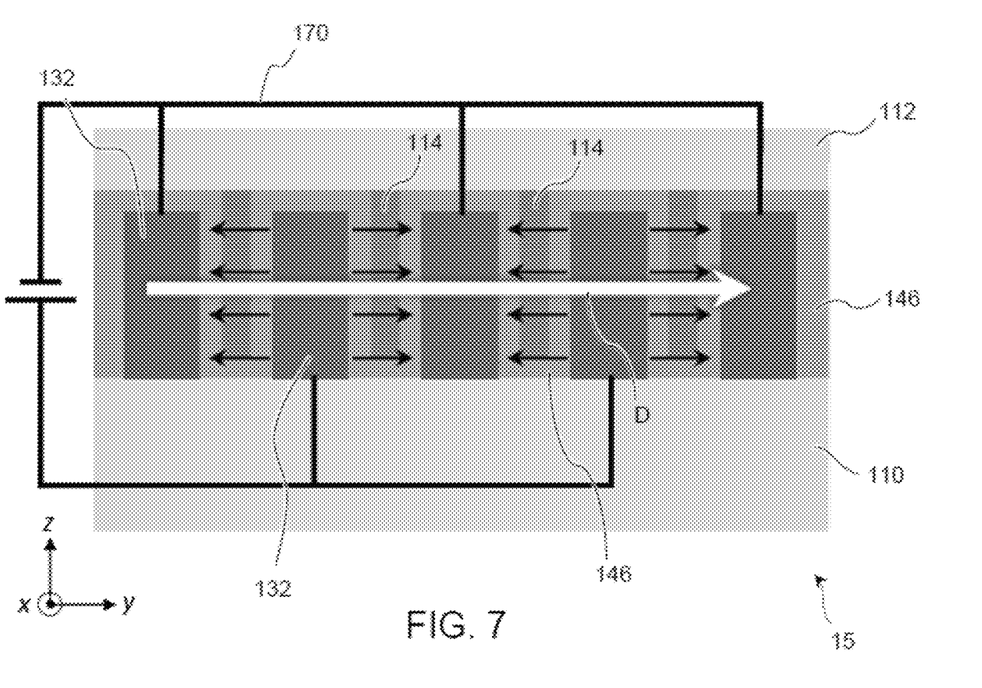

In embodiments such as illustrated in FIGS. 6 and 7, the composite waveguide core of the EO device 14, 15 involves three distinct materials. Namely, the nonlinear material 146 coats the crosspieces 130, 132, which gives rise to layer portions 146 interlined between successive portions 132 of the crosspieces. In addition, the device 14, 15 comprises a dielectric material 112, 114 having portions inserted between the coated crosspieces 130, 132. Thus, in that case, the alternating sequence involves three distinct materials, i.e., the semiconductor material 132 of the crosspieces and two additional materials 146, 112, 114, the latter including the nonlinear material 146 and a dielectric material 112, 114.

As seen in FIG. 6 or 7, the alternating sequence comprises a repeating pattern formed by: a portion 132 of semiconductor material, a portion of the nonlinear material 146, a portion of dielectric material 112, 114, and another portion of nonlinear material 146. This pattern repeats along the light propagation axis D. The EO device 15 may advantageously involves a dielectric material 114 that is a high-κ dielectric material (for field enhancement), inserted between successive crosspieces 130, 132, as assumed in FIG. 7. Note, more than two additional materials may possibly be involved, beyond the semiconductor material 132.

The examples discussed above in reference to FIGS. 2-4, 6, and 7 relate to embodiments where portions 140, 142, 146 of the nonlinear are arranged between the portions 132 of the semiconductor crosspieces. The devices 10, 11 (FIGS. 2, 3), where the nonlinear material 140 clads the waveguide structure on top (note, the nonlinear material is not shown in FIG. 3C) is easy to process with standard lithographic processes. The device 12 (FIG. 4) requires additional process steps to remove excess material 142 after deposition thereof and deposit the upper cladding 112. This solution may lead to a better light confinement, given that the refractive index contrast may be optimized by suitably choosing the material of the upper cladding 112. Similarly, the devices 14, 15 shown in FIGS. 6, 7 may have better performance but additional lithographic process steps are needed to deposit the layer 146 of nonlinear material and the intercalated material 112, 114, which are subsequently cladded 112.

Figure 5A:
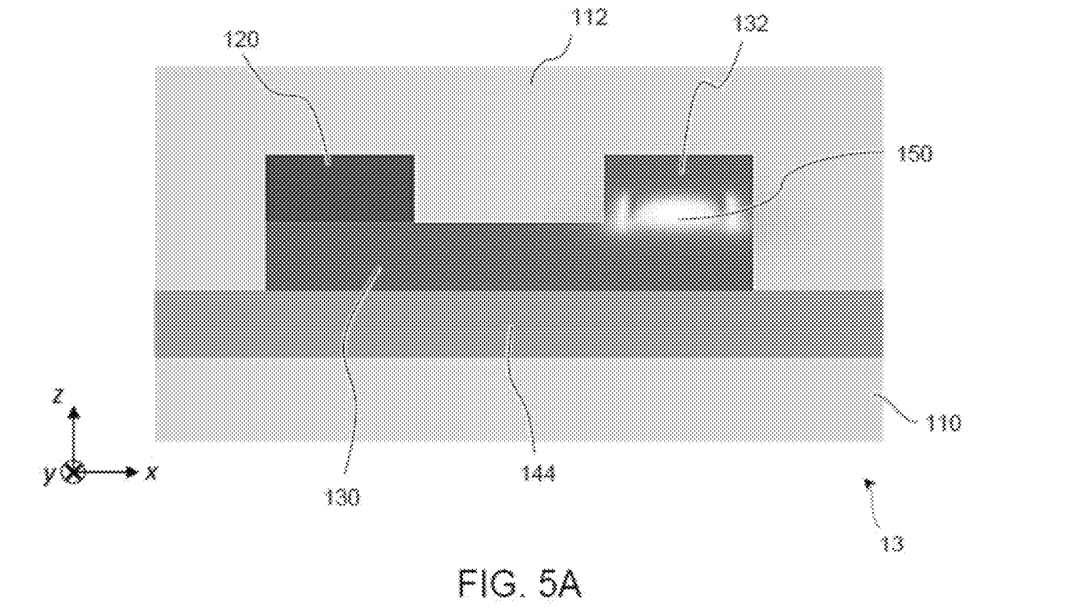
Figure 5B:
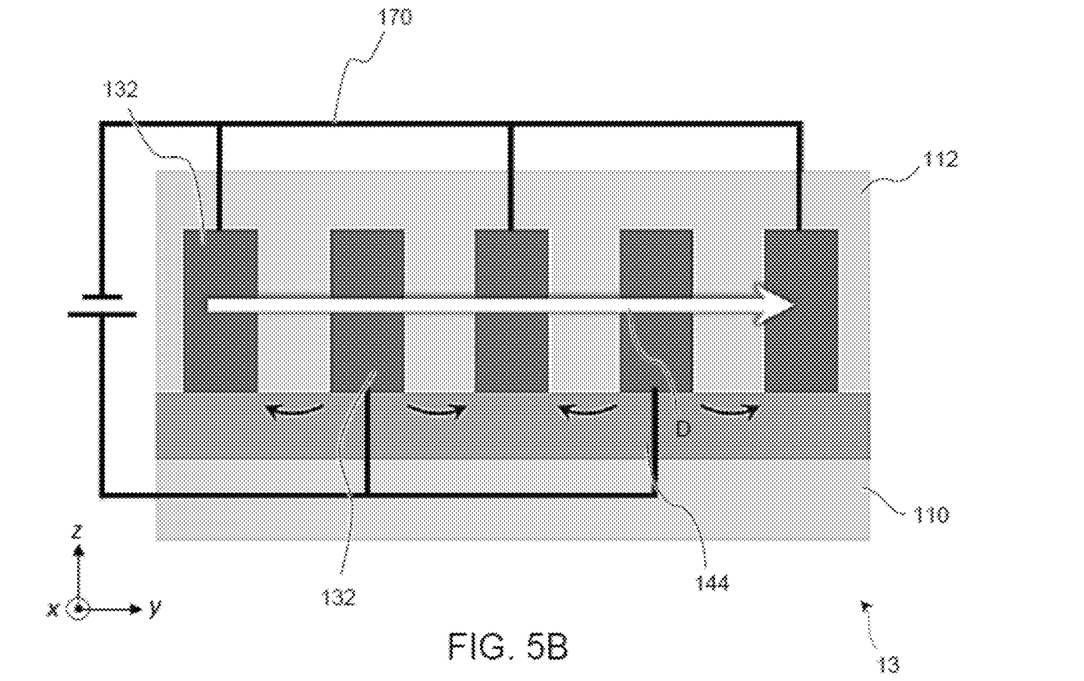

The embodiment illustrated in FIGS. 5A and 5B provides a simpler alternative. In this case, the EO device 13 involves a nonlinear material 144 that is formed as a mere layer 144. The layer 144 extends on top of the substrate 110, and the interdigitated crosspieces 130, 132 extend on top of the layer 144, so as to be in contact therewith.

In each of the examples of FIGS. 3-6, the semiconducting material 130, 132 is used to apply a modulating electric field across the nonlinear material. The modulation of the electric field is depicted by small, black arrows extending in opposite directions from one portion of nonlinear material to the other. This effect is also visible in the case where the nonlinear material is provided as a mere layer 144 underneath the crosspieces 130, 132, as depicted by curved arrows in FIG. 5B. The large, white arrow D denotes the light propagation axis D. A density profile 150 of an optical mode in transverse electric (TE) polarization is depicted as a density plot overlaid on the portions 132 of the crosspieces in FIGS. 3A, 4A, and 5A.

The interdigitated crosspieces 130, 132 of the EO devices 10-15 are preferably shaped as beams 130 that are anchored, each, at respective anchorage ends at the level of their respective contact layers 120, as illustrated in FIGS. 2-9. In embodiments, each contact layer 120 is patterned on the outer side of the beams 130, so as to coat the beams and thereby anchor them at the level their outer side, see FIG. 2. Because the crosspieces 130, 132 are interdigitated, inner portions 132 of the crosspieces are overlapping, i.e., are opposite to each other at the level of the light propagation direction axis. In that respect, each crosspiece may comprise a section 132 of increased area forming a plate 132, at the level of the light propagation axis D. Such plates 132 face each other along the propagation direction D.

The plates 132 may be patterned at the level of inner ends of the beams 130, as assumed in FIGS. 2-5. In variants, the plates 132 are located in an inner section of the beams 130, such that residual portions of the beams 130 protrudes beyond the plates 132, toward the opposite contact layer, as assumed in FIGS. 8 and 9. That is, each plate is located near the center of a respective beam in that case, such that a residual end 133 of the beam projects from the plate 132, in the direction opposite to that of its anchorage point. This allows the propagation region to be made more symmetric about each beam plate 132, along the axis D of light propagation.

In terms of dimensions, the average width W1 of the plates 132 is preferably between 200 nm and 5 000 nm, whereas the average gap W2 between the two contact layers 120 is typically between 500 nm and 10 000 nm, to allow for the beams 130. The average length of the beam is, by design, necessarily less than this average gap. The above dimensions (the average width, gap, and length) are, each, measured along x, i.e., parallel to the average plane of the substrate 110, and perpendicularly to the direction D of light propagation.

The average heights of the plates 132 and beams 130 are preferably between 100 nm and 500 nm, and between 20 nm and 450 nm, respectively, with the proviso that the average height of the plates 132 is strictly larger than the average height of the beams 130 latter. Said heights are measured perpendicularly to the average plane of the substrate 110, i.e., parallel to axis z.

In embodiments as in FIG. 5, the average thickness of the layer 144 of nonlinear material is preferably between 20 nm and 1 000 nm. In embodiments as in FIGS. 6 and 7, the thickness of the layer 146 is typically between 20 nm and 200 nm, it being noted that this thickness must be substantially less than the gap d between two successive plates 132.

In that respect, the average pitch A of pairs of consecutive crosspieces 130, 132 (i.e., corresponding to two immediately consecutive beams extending from distinct contact layers 120) is preferably between 50 nm and 500 nm. The pitch is measured along the direction D of light propagation, i.e., along y, see FIG. 2. Closely related, the width B (as measured along y) of the beams 130 can be chosen such as for the average duty cycle for said pairs of consecutive crosspieces 130, 132 to between 0.05 and 0.95. Such dimensions allow the gap between immediately consecutive electrodes to be markedly reduced, e.g., down to 100 nm.

According to an example, the strength (E) of the electric field can be enhanced. For a Pockels material, the change of refractive index will be on the order of E, i.e., $\Delta n \sim E$, whereas for a Kerr material, $\Delta n \sim E2$. Now, E is proportional to the distance d between the electrodes. Thus, the present approach allows the electrode gap to be markedly reduced (as opposed to a lateral electrode configuration), which increases E for a given voltage. Note, for conventional integrated Pockels/Kerr modulator, the gap between the electrodes extending along the waveguide is $d \approx 5$ μm, whereas for the present devices 10-15, this gap can be reduced to, e.g., $d \approx 100$ nm (i.e., ~50×smaller), this provide a ~50×improvement in modulation efficiency for a Pockels material, or a ~502=2 500×improvement for a Kerr material.

Next, in terms of propagation losses, a slot waveguide structure certainly makes it possible to reduce the electrode gap, e.g., to $d \approx 100$ nm. However, the propagation losses in that case are typically larger than 20 dB/cm. On the contrary, the propagation losses for a subwavelength grating waveguide can be as low as ~2 dB/cm. Thus, for same electrode gap d, the present approach may offer a ~100×improvement in terms of propagation losses, corresponding to ~20 dB.

Figure 8:
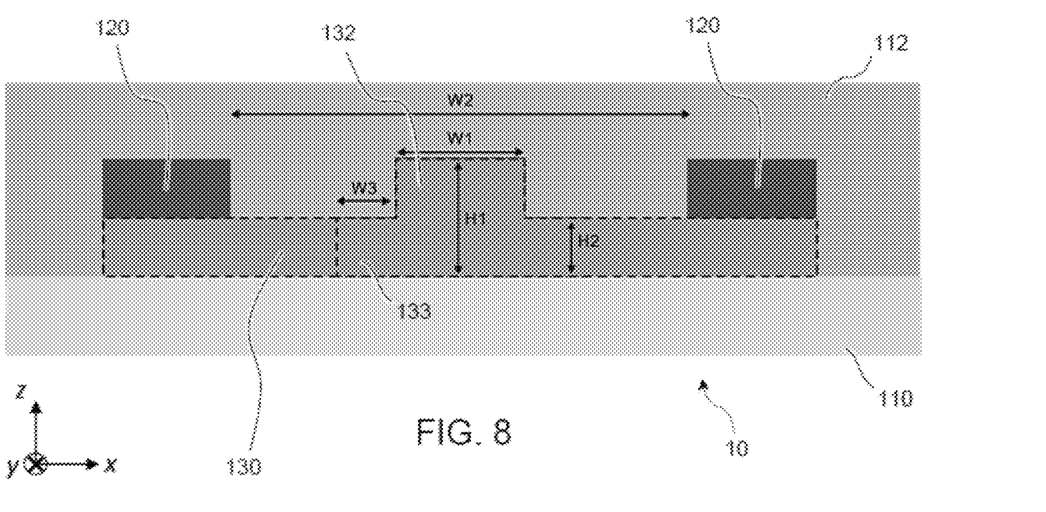
Figure 9:
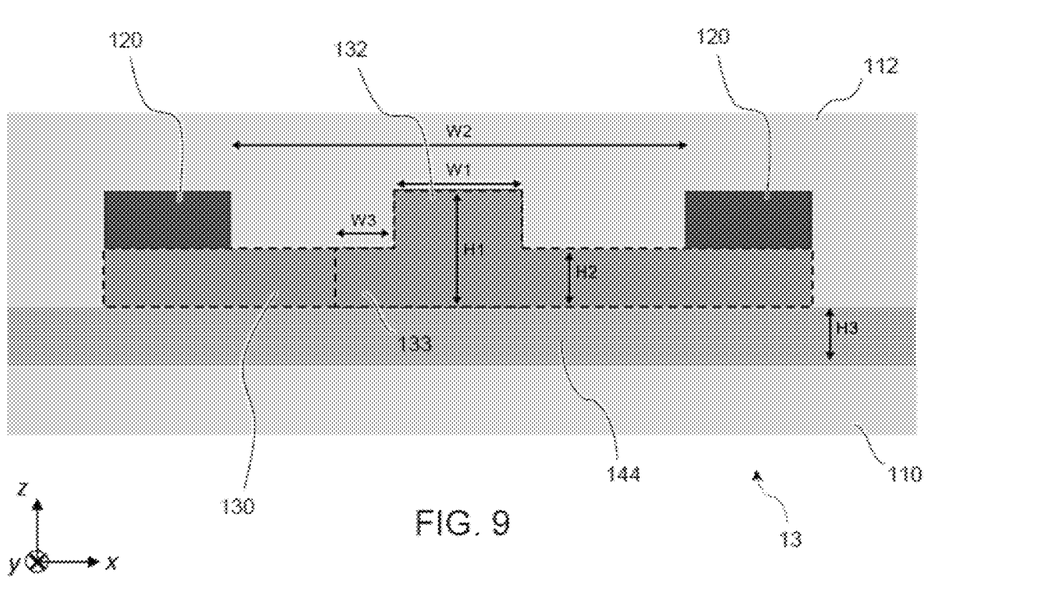

The following lists preferred dimensional ranges of quantities indicated in FIGS. 8 and 9, which can be contemplated to achieve performance such as discussed above:

H1: Between 100 and 500 nm;
H2: Between 20 and 450 nm, subject to H2<H1;
H3: Between 20 and 1 000 nm;
W1: Between 200 and 5 000 nm;
W2: Between 500 and 10 000 nm; and
W3: Between 0 and 10 000 nm, subject to W3<(W2−W1)/2.

Figure 10:
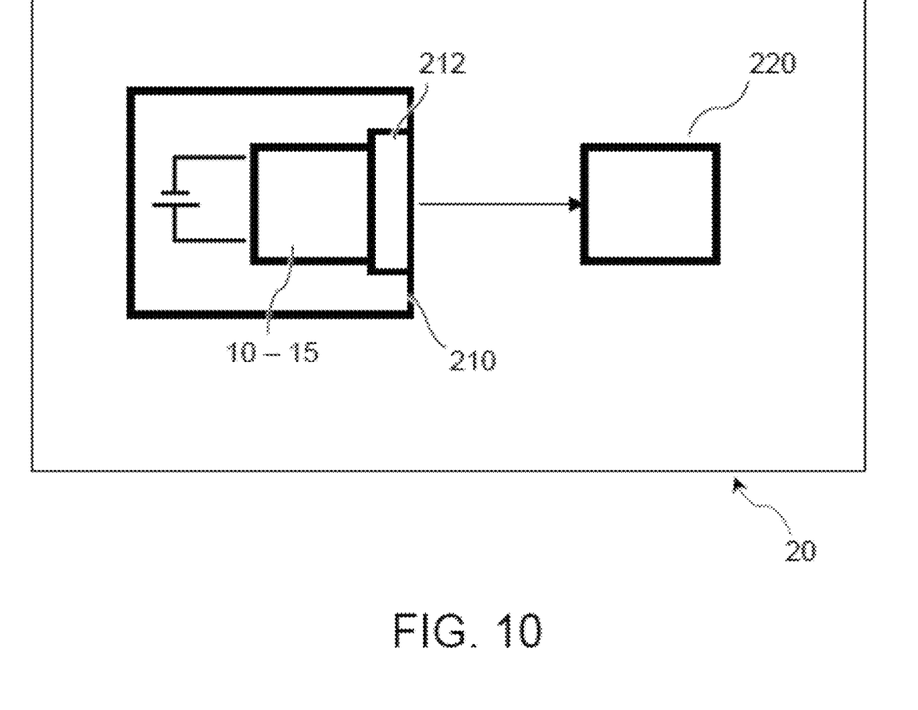
FIG. 10 schematically represents a quantum computer comprising a photonic switch with a device such as depicted in FIGS. 2-9, as in embodiments of the invention.

Next, another aspect of the invention is now described in reference to FIG. 10, which relates to a photonic switch 210. The latter comprises an EO device 10-15 such as described above. Such a switch 210 may notably be used in a quantum information processing apparatus 20, as assumed in FIG. 10.

Note, the quantum information processing apparatus may possibly be configured as a photonic quantum computer. In preferred variants, however, the apparatus 20 relies on superconducting qubits 220. The switch 210 may thus form part of an input/output interface, used to transmit data from the cryogenic environment of the apparatus to room temperature for readout and communication. A light coupler 212 is used to outcouple light from the waveguide structure of the EO device 10-15, which is then coupled into an optical fiber. The optical fiber is used to transmit the optical signal from the cryogenic environment.

While the present invention has been described with reference to a limited number of embodiments, variants and the accompanying drawings, it will be understood by those skilled in the art that various changes may be made and equivalents may be substituted without departing from the scope of the present invention. In particular, a feature (device-like or method-like) recited in a given embodiment, variant or shown in a drawing may be combined with or replace another feature in another embodiment, variant or drawing, without departing from the scope of the present invention. Various combinations of the features described in respect of any of the above embodiments or variants may accordingly be contemplated, that remain within the scope of the appended claims. In addition, many minor modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims. In addition, many other variants than explicitly touched above can be contemplated.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

What is claimed is:

1. An electro-optical device comprising
a substrate; and
supported by the substrate:
two contact layer portions, extending side-by-side along a direction of light propagation that is parallel to the substrate, and
a waveguide structure for guiding light along said direction of light propagation, the waveguide structure comprising:
interdigitated crosspieces of a semiconductor material extending parallel to the substrate from each of said two contact layer portions and transversely to such portions, wherein the interdigitated crosspieces comprise respective beams anchored, each, at respective anchorage ends at a level of one of the contact layer portions, and
an optically nonlinear material, in contact with at least portions of the interdigitated crosspieces, wherein said crosspieces are not in direct contact with each other, so as to form a composite waveguide core involving an alternating sequence of distinct materials along said propagation direction, the distinct materials comprising said semiconductor material and at least one additional material, whereby the composite waveguide core has an effective refractive index.

2. The electro-optical device according to claim 1, wherein said optically nonlinear material is structured so as to have portions between the crosspieces, whereby said at least one additional material of the alternating sequence of distinct materials comprises said optically nonlinear material.

3. The electro-optical device according to claim 2, wherein said portions of the optically nonlinear material entirely fill spaces between the crosspieces, whereby said distinct materials of the alternating sequence of distinct materials consist of said semiconductor material and said nonlinear material.

4. The electro-optical device according to claim 3, wherein said optically nonlinear material clads the crosspieces, such that said portions of the optically nonlinear material are intercalated between the crosspieces.

5. The electro-optical device according to claim 3, wherein said optically nonlinear material consists of said portions and the device further comprises a cladding material coating both the crosspieces and said portions of the nonlinear material.

6. The electro-optical device according to claim 2, wherein said optically nonlinear material coats the crosspieces, and the device further comprises a dielectric material having portions between the coated crosspieces, whereby said distinct materials of the alternating sequence comprise said semiconductor material and at least two additional materials, the latter including both the optically nonlinear material and the dielectric material.

7. The electro-optical device according to claim 6, wherein said dielectric material is a high-κ dielectric material.

8. The electro-optical device according to claim 1, wherein said optically nonlinear material is formed as a layer extending on top of the substrate, and the interdigitated crosspieces extend on top of the layer of optically nonlinear material, so as to be in contact therewith.

9. The electro-optical device according to claim 8, wherein an average thickness of the layer of optically nonlinear material is between 20 nm and 1 000 nm.

10. The electro-optical device according to claim 1, wherein said nonlinear material comprises one or more of: $BaTiO_3$, $Ba_xSr_{1-x}TiO_3$, $Pb[Zr_xTi_{1-x}]O_3$, $[Pb_yLa_{1-y}][Zr_xTi_{1-x}]O_3$, $KNbO_3$, $BiFeO_3$, $KTaO_3$, $LiNbO_3$, $HfO_2$, $Hf_{1-x}Zr_xO_2$, GaP, AlN, $Ba_2NaNb_5O_{15}$, $KH_2PO_4$, $NH_4H_2PO_4$, $BaB_2O_4$, $LiB_3O_5$, SiN, graphene, CdSe-based quantum dots, a polymer material, and a material selected from organic chromophores.

11. The electro-optical device according to claim 1, wherein said semiconductor material comprises one of: Si, Ge, SiGe, GaAs, InGaAs, InP, GaP, InGaP, InAs, InAlGaAs, GaSb, GaN, AlN, GaAsP, and AlGaP.

12. The electro-optical device according to claim 1, wherein each of the contact layer portions is patterned on one side of the beams, at a level of the anchorage ends thereof.

13. The electro-optical device according to claim 1, wherein each of the beams comprises a section of increased area forming a plate at a level of the direction of light propagation, whereby plates of the beams are facing each other along said direction of light propagation.

14. The electro-optical device according to claim 13, wherein an average width of the plates is between 200 nm and 5 000 nm, an average gap between the two contact layer portions is between 500 nm and 10 000 nm, an average length of the beam being strictly less than said average gap, and said average width, said average gap, and said average length are, each, measured parallel to an average plane of the substrate and perpendicularly to the direction of light propagation.

15. The electro-optical device according to claim 13, wherein average heights of the plates and beams are between 100 nm and 500 nm, and between 20 nm and 450 nm, respectively, the former being strictly larger than the latter, and said average heights are measured perpendicularly to an average plane of the substrate.

16. The electro-optical device according to claim 13, wherein each of the plates is located in an inner section of a respective one of the beams, whereby portions of said respective one of the beams protrudes from the plates toward an opposite one of the contact layer portions.

17. The electro-optical device according to claim 1, wherein an average pitch of pairs of consecutive crosspieces extending from respective ones of said contact layer portions is between 50 nm and 500 nm, the pitch measured along said direction of light propagation.

18. The electro-optical device according to claim 17, wherein an average duty cycle for said pairs of consecutive crosspieces, as measured along said direction of light propagation, is between 0.05 and 0.95.

* * * * *